(12) United States Patent
Chae et al.

(10) Patent No.: US 9,300,502 B2
(45) Date of Patent: Mar. 29, 2016

(54) METHOD AND DEVICE FOR PERFORMING COORDINATED PRECODING IN WIRELESS ACCESS SYSTEM

(71) Applicant: LG ELECTRONICS INC., Seoul (KR)

(72) Inventors: Hyukjin Chae, Anyang-si (KR); Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/390,963

(22) PCT Filed: Apr. 8, 2013

(86) PCT No.: PCT/KR2013/002921
§ 371 (c)(1),
(2) Date: Oct. 6, 2014

(87) PCT Pub. No.: WO2013/151405
PCT Pub. Date: Oct. 10, 2013

(65) Prior Publication Data
US 2015/0078282 A1    Mar. 19, 2015

Related U.S. Application Data

(60) Provisional application No. 61/620,994, filed on Apr. 6, 2012.

(51) Int. Cl.
| | |
|---|---|
| *H04W 4/00* | (2009.01) |
| *H04L 25/03* | (2006.01) |
| *H04B 7/02* | (2006.01) |
| *H04B 7/04* | (2006.01) |
| *H04B 7/06* | (2006.01) |

(52) U.S. Cl.
CPC .......... *H04L 25/03904* (2013.01); *H04B 7/024* (2013.01); *H04B 7/0413* (2013.01); *H04B 7/0456* (2013.01); *H04B 7/0617* (2013.01); *H04L 2025/03789* (2013.01)

(58) Field of Classification Search
None
See application file for complete search history.

(56) References Cited

U.S. PATENT DOCUMENTS

| | | | | |
|---|---|---|---|---|
| 2009/0069054 A1* | 3/2009 | Zangi | .................... | H04L 5/0023 455/562.1 |
| 2012/0113794 A1* | 5/2012 | Roman | ................ | H04B 7/0452 370/201 |
| 2013/0021991 A1* | 1/2013 | Ko | ........................ | H04B 7/0413 370/329 |

FOREIGN PATENT DOCUMENTS

| | | |
|---|---|---|
| KR | 10-2009-0073758 A | 7/2009 |
| KR | 10-2011-0030280 A | 3/2011 |
| KR | 10-2011-0069164 A | 6/2011 |
| KR | 10-2011-0078200 A | 7/2011 |

* cited by examiner

*Primary Examiner* — Kouroush Mohebbi
(74) *Attorney, Agent, or Firm* — Dentons US LLP

(57) ABSTRACT

The present invention discloses a method and device for performing coordinated precoding in a wireless access system. In particular, the present invention includes: transmitting, to a base station, a measurement result of a plurality of interference signals by a terminal, the plurality of interference signals being transmitted from a plurality of adjacent base stations; receiving quasi-orthogonal CDM (Q-CDM) code information from the base station by the terminal in order to remove some of the plurality of interference signals, the Q-CDM code information being determined by the base station and the plurality of adjacent base stations; transmitting information on a channel state to the base station on the basis of a Q-CDM code by the terminal; and receiving downlink data, to which coordinated precoding is applied, from the base station by the terminal. Interference signals that have an intensity greater than a predetermined threshold from among the plurality of interference signals may be removed by using the Q-CDM code, and interference signals that have an intensity less than the predetermined threshold from among the plurality of interference signals may be removed by using null precoding.

10 Claims, 13 Drawing Sheets

METHOD AND DEVICE FOR PERFORMING COORDINATED PRECODING IN WIRELESS ACCESS SYSTEM

This application is a 35 USC §371 National Stage entry of International Application No. PCT/KR2013/002921 filed on Apr. 8 2013, which claims priority to U.S. Provisional Application Nos. 61/620,994 filed on Apr. 6, 2012, both of which is hereby incorporated by reference in their entirety.

TECHNICAL FIELD

The present invention relates to a wireless communication system, and more particularly to a method for performing coordinated precoding between a plurality of base stations (BSs) in a wireless access system, and an apparatus for supporting the same.

BACKGROUND ART

The most important requirement of a next-generation wireless access system is to support a high data transfer rate. To achieve this, various technologies such as Multiple Input Multiple Output (MIMO), Cooperative Multiple Point Transmission (CoMP), relay, etc. have been developed and studied.

Joint Processing (JT) is a representative base station (BS) coordinated scheme. However, JT requires a high rate backhaul between the base stations (BSs) to implement data sharing, so that there is a limitation to use the JT scheme when there is no high rate backhaul. If the base stations (BSs) share only channel information, Interference Alignment (IA) and Coordinated Beamforming (CBF) may be used. Whereas IA can implement the degree of freedom (DoF) that linearly increases in proportion to the number of users (i.e., user equipments) in the same manner as in JT, the IA has a disadvantage in that all UEs must recognize all channel information and must perform symbol extension to a time axis or a frequency axis. CBF need not perform symbol extension, and feeds back a smaller amount of channel information than the IA, so that the CBF can be relatively easily implemented as compared to the IA scheme.

The above-mentioned BS operation schemes (JT, IA, CBF) are characterized in that all receivers must feed back a variety of CSI (Channel State Information). However, according to a frequency division duplex (FDD) system in which a total of feedback bits are limited, as a feedback link increases, CSI accuracy of each feedback link is deteriorated, so that the number of feedback links significantly affects system performance.

DISCLOSURE

Technical Problem

An object of the present invention is to provide a method and apparatus for facilitating coordinated precoding between a plurality of base stations (BSs) in a wireless access system.

An object of the present invention is to provide a method and apparatus for requesting precoding matrix index (PMI) restriction from only one contiguous BS in a multi-user interference channel, resulting in cancellation of contiguous UE interference.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for supporting coordinated precoding in a wireless access system including: transmitting, by a user equipment (UE), a measurement result of a plurality of interference signals transmitted from a plurality of contiguous base stations (BSs) to a base station (BS); receiving, by the user equipment (UE), quasi-orthogonal CDM (Q-CDM) code information decided by the base station (BS) and the plurality of contiguous base stations (BSs) from the base station (BS) so as to remove some of the plurality of interference signals; transmitting, by the user equipment (UE), channel state information (CSI) to the base station (BS) on the basis of the Q-CDM code; and receiving, by the user equipment (UE), downlink data to which the coordinated precoding is applied, from the base station (BS), wherein an interference signal having a higher intensity than a predetermined threshold value from among the plurality of interference signals is removed through the Q-CDM code, and an interference signal having a lower intensity than a predetermined threshold value from among the plurality of interference signals is removed through null precoding.

In accordance with another aspect of the present invention, a user equipment (UE) device for supporting coordinated precoding in a wireless access system includes: a radio frequency (RF) unit configured to transmit/receive a radio frequency (RF) signal; and a processor, wherein the processor transmits a measurement result of a plurality of interference signals transmitted from a plurality of contiguous base stations (BSs) to a base station (BS), receives quasi-orthogonal CDM (Q-CDM) code information decided by the base station (BS) and the plurality of contiguous base stations (BSs) from the base station (BS) so as to remove some of the plurality of interference signals, transmits channel state information (CSI) to the base station (BS) on the basis of the Q-CDM code, and receives downlink data to which the coordinated precoding is applied, from the base station (BS). An interference signal having a higher intensity than a predetermined threshold value from among the plurality of interference signals is removed through the Q-CDM code, and an interference signal having a lower intensity than a predetermined threshold value from among the plurality of interference signals is removed through null precoding.

The measurement result may include signal intensity information of the plurality of interference signals.

The measurement result may include one or more Q-CDM code information for removing an interference signal having a higher signal intensity than a predetermined threshold value from among the plurality of interference signals.

The measurement result is any one of channel quality information (CQI) of the plurality of interference signals, a reference signal received power (RSRP), and a received signal strength indicator (RSSI).

The channel quality information (CQI) may include at least one of a precoding matrix indicator (PMI) and channel quality information (CQI).

Advantageous Effects

As is apparent from the above description, the embodiments of the present invention can facilitate coordinated precoding between contiguous eNBs or BSs in a wireless access system.

The embodiments of the present invention can request precoding matrix index (PMI) restriction from only one contiguous BS in a multi-user interference channel, resulting in cancellation of contiguous UE interference.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
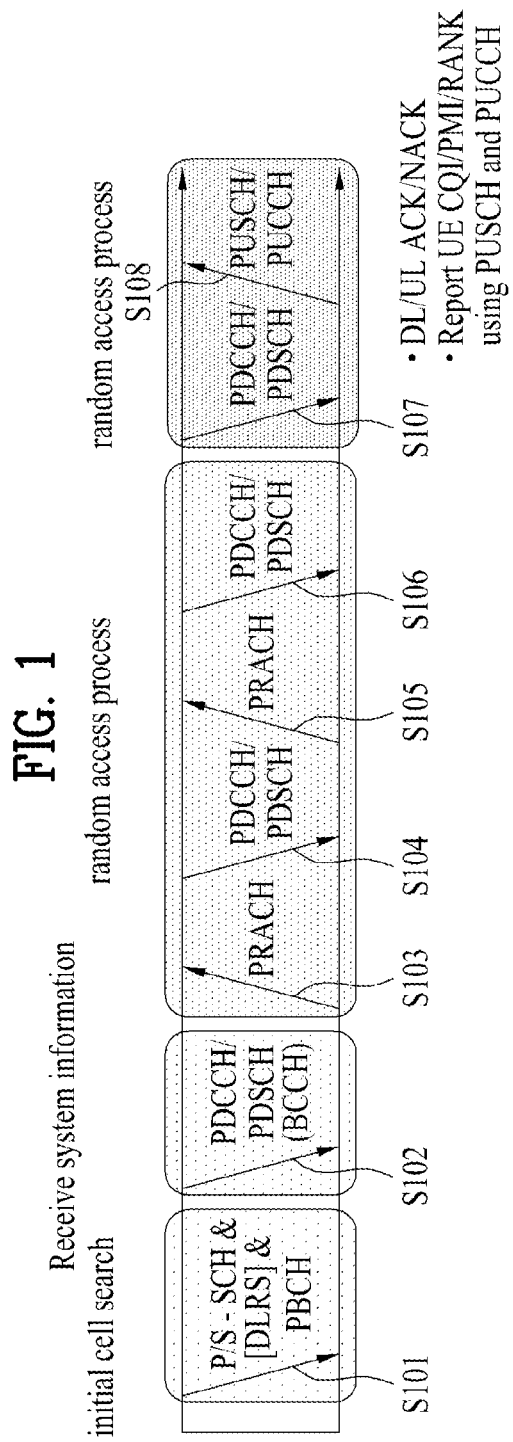
FIG. 1 is a conceptual diagram illustrating physical channels used in a 3GPP LTE system and a general method for transmitting a signal using the physical channels.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some cases, in order to prevent ambiguity of the concepts of the present invention, conventional devices or apparatuses well known to those skilled in the art will be omitted and denoted in the form of a block diagram on the basis of important functions of the present invention.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with the terms fixed station, Node-B, eNode-B (eNB), or an access point (AP) as necessary. The term "relay" may be replaced with a Relay Node (RN) or a Relay Station (RS). The term "terminal" may also be replaced with the terms User Equipment (UE), Mobile Station (MS), Mobile Subscriber Station (MSS), Subscriber Station (SS), Advanced Mobile Station (AMS), Wireless Terminal (WT), Machine-Type Communication (MTC) apparatus, Machine-to-Machine (M2M) apparatus or Device-to-Device (D2D) apparatus as necessary.

It should be noted that specific terms disclosed in the present invention are proposed for convenience of description and better understanding of the present invention, and the use of these specific terms may be changed to another format within the technical scope or spirit of the present invention.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

For clarity, the following description focuses on 3GPP LTE and 3GPP LTE-A. However, technical features of the present invention are not limited thereto.

Overview of 3GPP LTE/LTE-A Systems Applicable to the Present Invention

FIG. 1 is a conceptual diagram illustrating physical channels for use in a 3GPP system and a general method for transmitting a signal using the physical channels.

Referring to FIG. 1, when powered on or when entering a new cell, a UE performs initial cell search in step S101. The initial cell search involves synchronization with a BS. Specifically, the UE synchronizes with the BS and acquires a cell Identifier (ID) and other information by receiving a Primary Synchronization Channel (P-SCH) and a Secondary Synchronization Channel (S-SCH) from the BS.

Then the UE may acquire information broadcast in the cell by receiving a Physical Broadcast Channel (PBCH) from the BS. During initial cell search, the UE may monitor a downlink channel status by receiving a downlink Reference Signal (DL RS).

After initial cell search, the UE may acquire more specific system information by receiving a Physical Downlink Control Channel (PDCCH) and receiving a Physical Downlink Shared Channel (PDSCH) based on information of the PDCCH in step S102.

Thereafter, if the UE initially accesses the BS, it may perform random access to the BS in steps S103 to S106. For random access, the UE may transmit a preamble to the BS on a Physical Random Access Channel (PRACH) in step S103 and receive a response message for random access on a PDCCH and a PDSCH corresponding to the PDCCH in step S104. In the case of contention-based random access, the UE may transmit an additional PRACH in step S105, and receive a PDCCH and a PDSCH corresponding to the PDCCH in step S106 in such a manner that the UE can perform a contention resolution procedure.

After the above random access procedure, the UE may receive a PDCCH/PDSCH (S107) and transmit a Physical Uplink Shared Channel (PUSCH)/Physical Uplink Control Channel (PUCCH) (S108) in a general uplink/downlink signal transmission procedure.

Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), Channel Quality Indictor (CQI), a Precoding Matrix Index (PMI), and a Rank Indicator (RI).

In the LTE system, UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Figure 2:
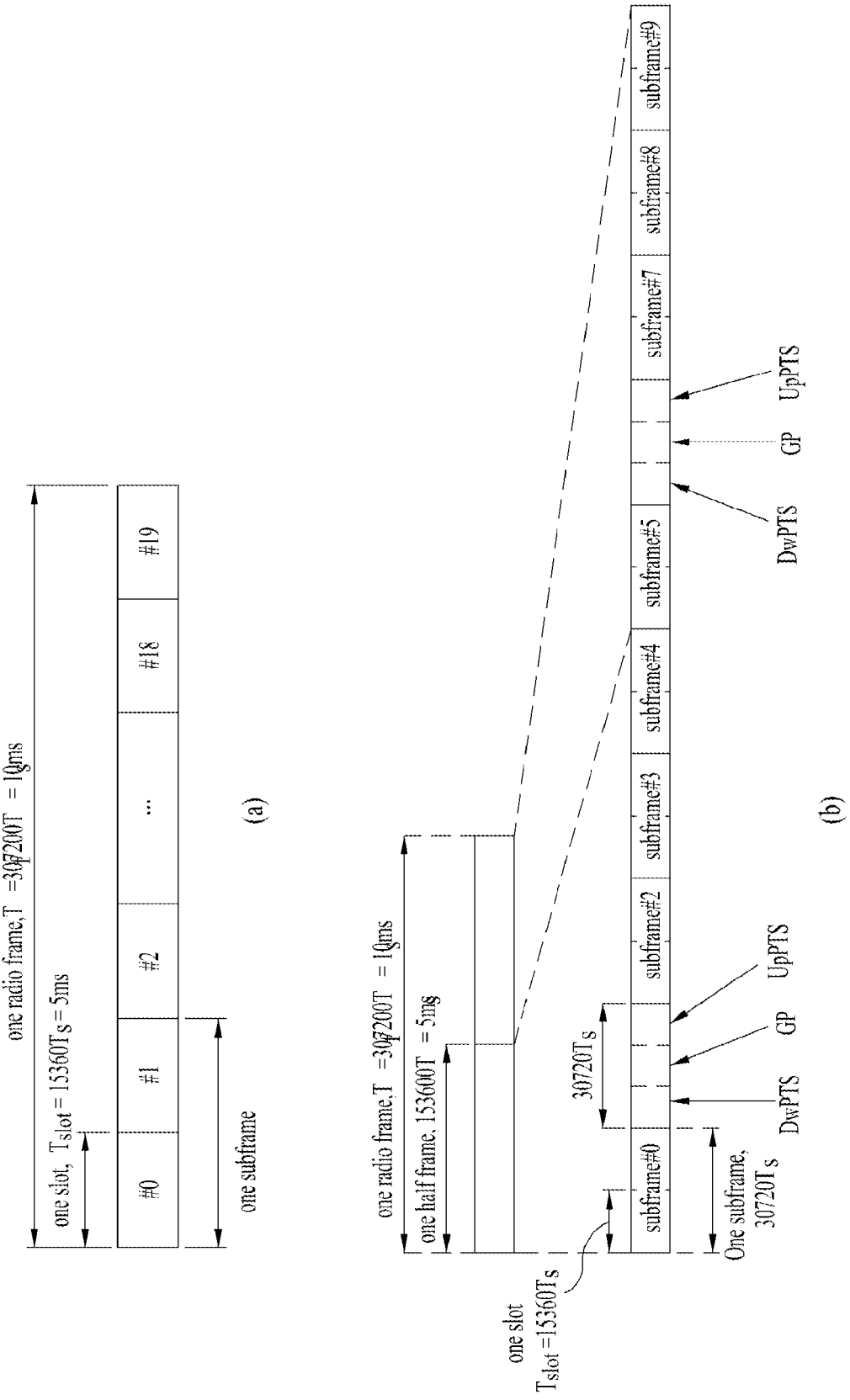
FIG. 2 is a diagram illustrating a structure of a radio frame for use in a 3GPP LTE system.

FIG. 2 is a diagram illustrating a structure of a radio frame for use in a 3GPP LTE system.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 2 (a) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2(b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
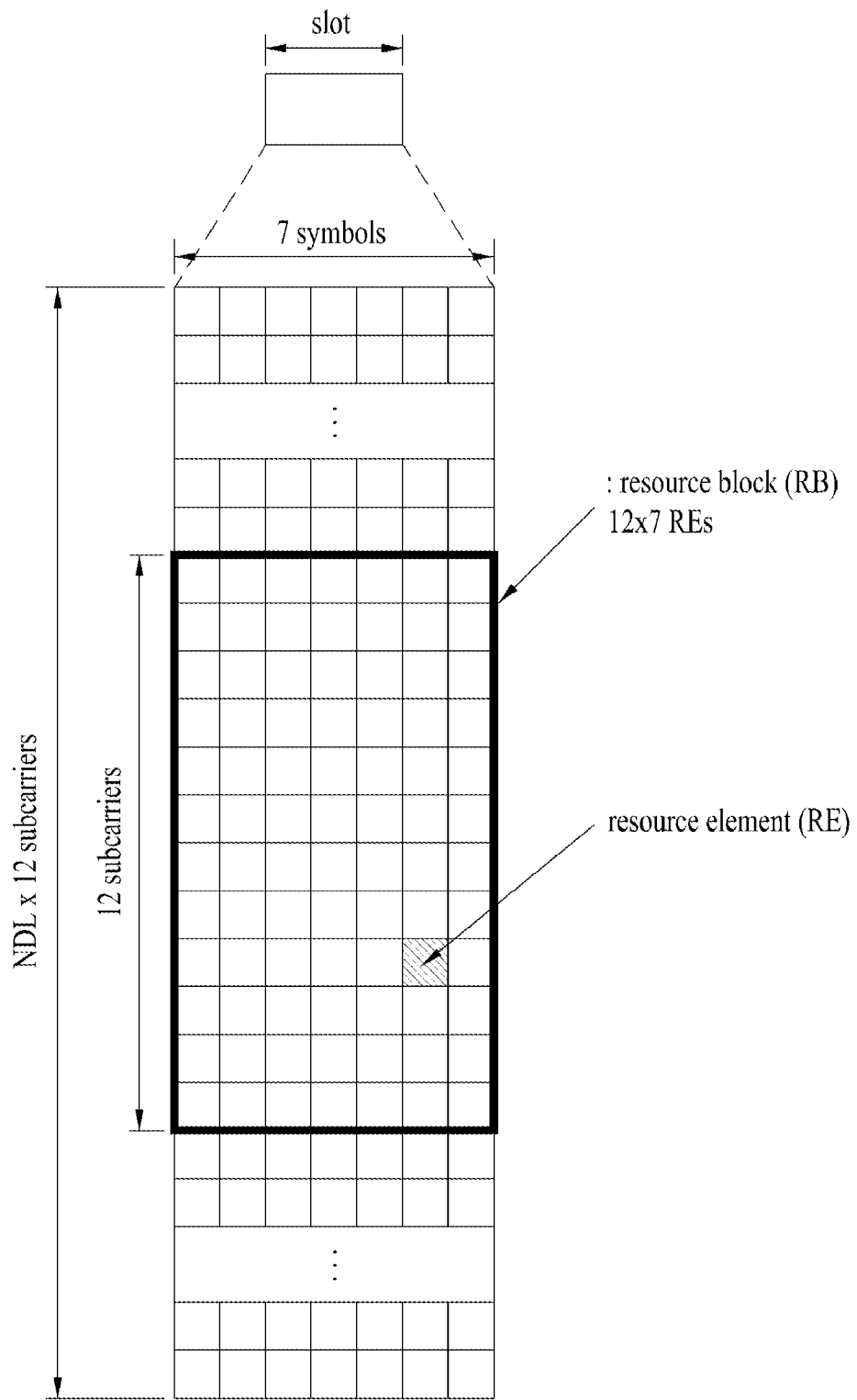
FIG. 3 exemplarily shows a resource grid of a single downlink slot.

FIG. 3 exemplarily shows a resource grid of a single downlink slot.

Referring to FIG. 3, one downlink slot includes a plurality of OFDM symbols in a time domain. Although one downlink slot includes 7 OFDM symbols and one resource block (RB) includes 12 subcarriers in a frequency domain, the scope or spirit of the present invention is not limited thereto.

Each element on a resource grid may be defined as a resource element (RE). One RB includes 12×7 REs. The number ($N^{DL}$) of RBs contained in a downlink slot is dependent upon a downlink transmission bandwidth. An uplink slot structure is identical to the downlink slot structure.

Figure 4:
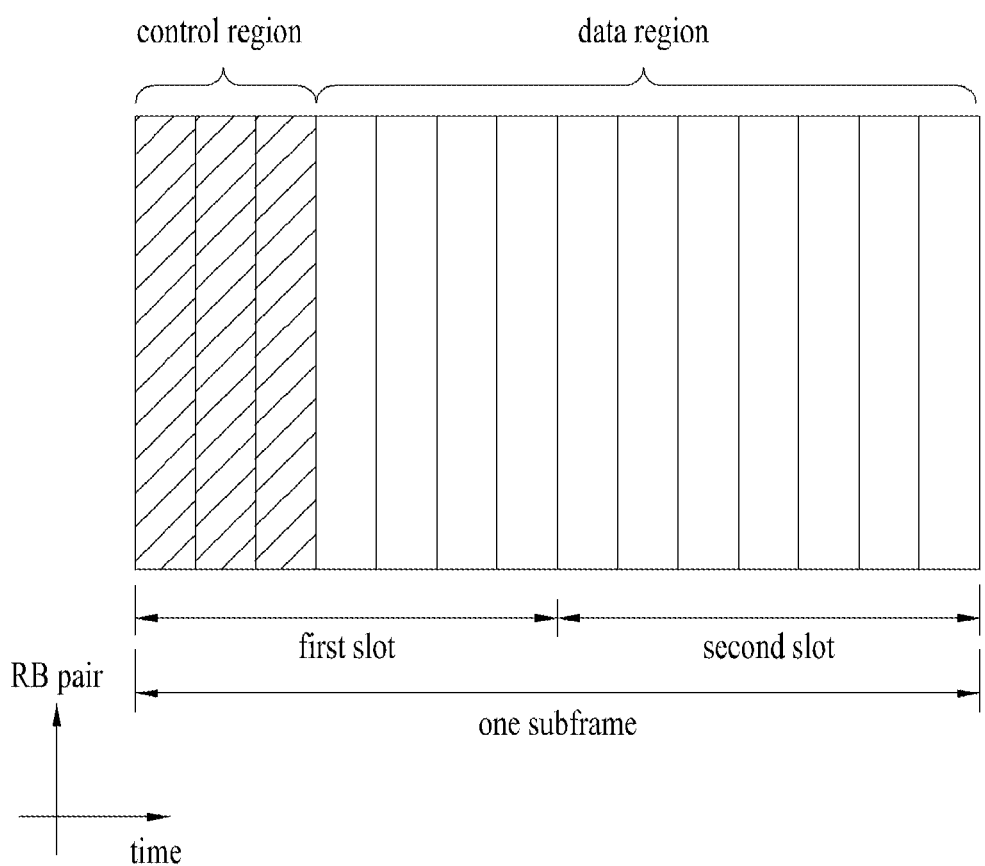
FIG. 4 illustrates a downlink subframe structure.

FIG. 4 illustrates a downlink subframe structure.

Referring to FIG. 4, a maximum of three OFDM symbols located in the front of a first slot of the subframe are used as a control region to which control channels are allocated, and the remaining OFDM symbols are used as a data region to which a Physical Downlink Shared Channel (PDSCH) is allocated. DL control channels for use in the 3GPP LTE system include a Physical Control Format Indicator Channel (PCFICH), a Physical Downlink Control Channel (PDCCH), a Physical Hybrid-ARQ Indicator Channel (PHICH), and the like.

PCFICH transmitted through a first OFDM symbol of the subframe may carry information about the number of OFDM symbols (i.e., size of the control region) used for transmission of control channels within the subframe. PHICH serving as a response channel to an uplink may carry ACK (Acknowledgement)/NACK (Non-Acknowledgement) signals about a Hybrid Automatic Repeat Request (HARQ). Control information transmitted over a PDCCH is referred to as Downlink Control Information (DCI). For example, DCI includes uplink resource allocation information (UL grant), downlink resource allocation information (DL grant), or an uplink transmission (UL Tx) power control command for an arbitrary UE group, etc.

PDCCH may carry information about resource allocation and transmission format (DL grant) of a downlink shared channel (DL-SCH), resource allocation information (UL grant) of an uplink shared channel (UL-SCH), paging information of a paging channel (PCH), resource allocation information about an upper layer control message such as a random access response transmitted over a PDSCH, a set of transmission power control commands for each UE contained in an arbitrary UE group, and information about Voice over Internet Protocol (VoIP) activation, etc. A plurality of PDCCHs may be transmitted within the control region, and the UE may monitor the PDCCHs. Each PDCCH includes an aggregate of one or more contiguous control channel elements (CCEs). A CCE is a logical allocation unit for providing a coding rate based on a radio frequency (RF) channel status to the PDCCH. A CCE may correspond to a plurality of resource element groups. PDCCH format and the number of available PDCCHs may be determined according to the relationship between the number of CCEs and the coding rate provided by CCEs.

A base station (BS) determines PDCCH format in accordance with DCI to transmit to a user equipment (UE) and attaches CRC (cyclic redundancy check) to control information. The CRC is masked with a unique identifier (called RNTI (radio network temporary identifier)) in accordance with an owner or usage of PDCCH. If the PDCCH is provided for a specific user equipment (UE), the CRC can be masked with a unique identifier of the user equipment (UE), i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI)). In order to indicate a random access response that is a response to a transmission of a random access preamble of a user equipment (UE), CRC can be masked with RA-RNTI (random access-RNTI).

Figure 5:
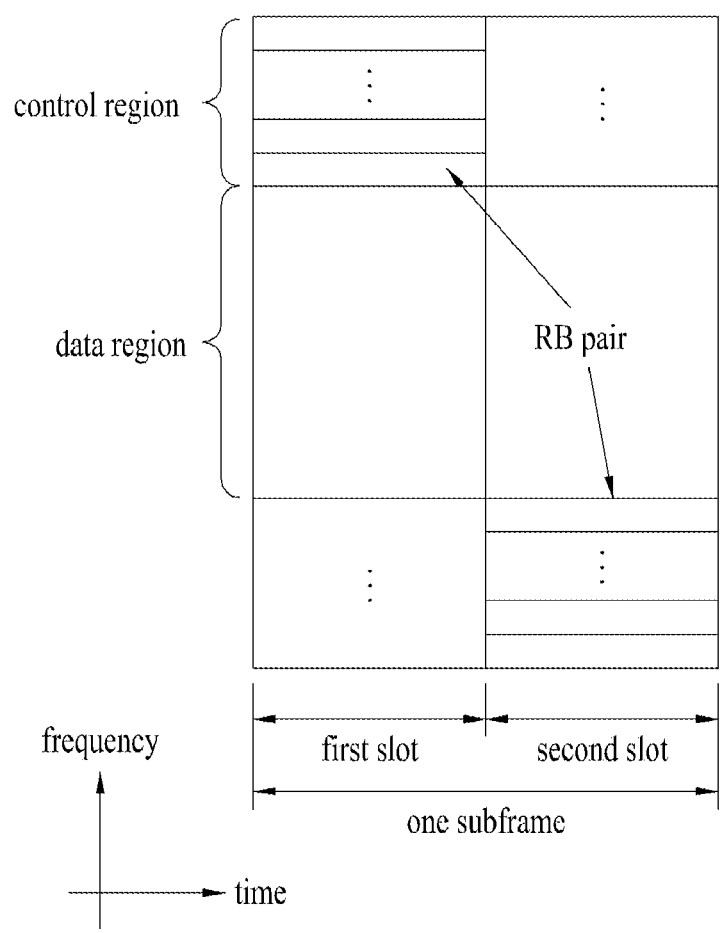
FIG. 5 illustrates an uplink subframe structure.

FIG. 5 illustrates an uplink subframe structure.

Referring to FIG. 5, a UL subframe is divided into a control region and a data region in the frequency domain. PUCCH carrying UL control information is allocated to the control region. PUSCH carrying user data is allocated to the data region. In order to maintain a single carrier property, one UE does not simultaneously transmit a PUCCH signal and a PUSCH signal. A PUCCH for one UE is allocated in an RB pair in a subframe and RBs belonging to the RB pair occupy different subcarriers in each of two slots. Thus, the RB pair allocated to the PUCCH is frequency-hopped on a slot boundary.

Multi-Input Multi-Output (MIMO) System

Figure 6:
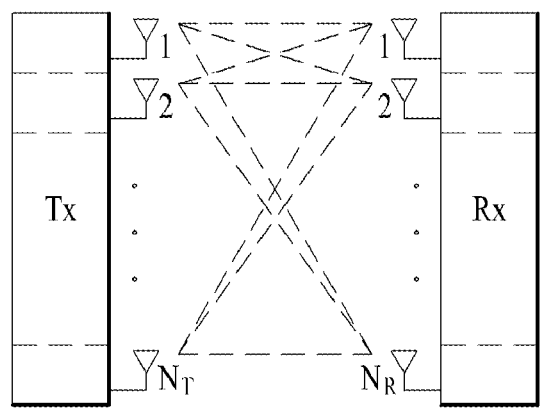
FIGS. 6 and 7 are block diagrams illustrating a wireless communication system having multiple antennas.
Figure 7:
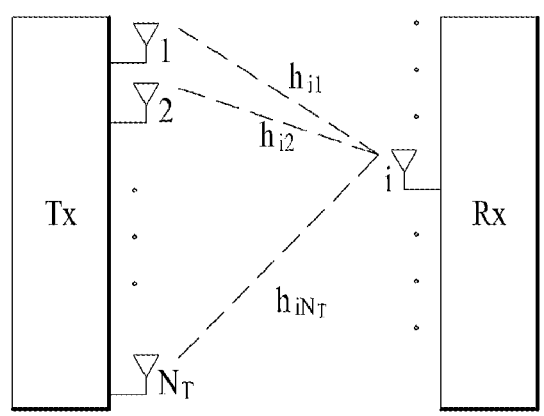

FIGS. 6 and 7 are block diagrams illustrating a wireless communication system having multiple antennas.

Referring to FIG. 6, when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \qquad \text{[Equation 1]}$$

For instance, a MIMO communication system with 4 Tx antennas and 4 Rx antennas may achieve a four-fold increase in transmission rate theoretically, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. It is assumed that $N_T$ Tx antennas and $N_R$ Rx antennas are present.

Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as follows.

$$\hat{s} = [\hat{s}_1, \hat{s}_2, \ldots, \hat{s}_{N_T}]^T = [Ps_1, Ps_2, \ldots, Ps_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{12} & w_2 & \cdots & w_{2N_T} \\ \vdots & & \ddots & \\ w_{i2} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 7 illustrates channels from $N_T$ Tx antennas to an $i^{th}$ Rx antenna. The channels may be represented as vectors and matrices by grouping them. As illustrated in FIG. 7, the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

In general, the rank of a matrix is defined as the smaller between the numbers of independent rows and columns. Accordingly, the rank of the matrix is not larger than the number of rows or columns. The rank of the matrix H, rank (H) is limited as follows.

$$\text{rank}(H) \leq \min(N_T, N_R) \quad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

Multi-User-MIMO (MU-MIMO) Operation

MU-MIMO is a scheme by which a BS including multiple antennas simultaneously provides a service to a plurality of users (e.g., UEs). When one BS simultaneously provides a service to a plurality of UEs, a signal transmitted to a UE may interfere with a signal delivered to another UE, deteriorating system performance. Accordingly, it is necessary to eliminate interference between UEs to successfully transmit/received data according to MU-MIMO. To achieve this, the BS can perform signal processing on signals to be transmitted to a plurality of UEs according to an interference cancellation technique.

The BS can encode information blocks to be delivered to UEs into independent codewords. The encoded codewords can be transmitted according to the interference cancellation technique. For example, the BS can cancel interference in advance for codewords transmitted from the BS to a plurality of UEs. When a signal transmitted to a UE $U_1$ is pre-subtracted from a signal transmitted to another UE $U_2$, the UE $U_2$ can receive the signal from the BS as if there is no interference, and thus additional interference cancellation need not be performed. ZF-DPC (Zero Forcing-Dirty Paper Coding), ZF (Zero Forcing) or the like can be used as an interference cancellation technique.

ZF-DPC is described first. When it is assumed that two UEs $U_1$ and $U_2$ are simultaneously provided with a service from a BS, a composite channel of a channel h1 of the UE $U_1$ and a channel h2 of the UE $U_2$ may be H=[h1 h2]. The composite channel H can be decomposed into a lower triangular matrix L and an orthogonal matrix Q, as represented by Equation 12, through LQ decomposition.

$$H = LQ = \begin{bmatrix} l_{11} & 0 \\ l_{21} & l_{22} \end{bmatrix} \begin{bmatrix} q_{11} & q_{12} \\ q_{21} & q_{22} \end{bmatrix}$$ [Equation 12]

When MIMO transmission is performed using columns of the matrix Q of Equation 12 as a beamforming vector, only the lower triangular matrix L remains in a signal received by a UE. If the BS knows channel environments of both the UEs, it is possible to perform encoding in such a manner that a component encoded without interference of the first row is transmitted avoiding an interference component of the second row. When a beamforming vector $w_i$ for each UE is $w_i=q_i$ (i.e. the beamforming vector for $U_1$ is $W_1$ and a beamforming vector for $U_2$ is w), an effective channel can be represented by Equation 13. Accordingly, a signal from which interference from a signal transmitted to another UE has been subtracted can be transmitted to a UE, and thus the UE can successfully receive the signal from the BS without additional interference cancellation operation.

$$h_i w_k = \begin{cases} l_{ii} & i = k \\ 0 & i \neq k \end{cases}$$ [Equation 13]

In the case of ZF beamforming, interference cancellation can be performed through pseudo-inverse of the composite channel H for multiple UEs, as represented by Equation 14.

$$F = H^H (H H^H)^{-1}$$ [Equation 14]

In Equation 14, $X^H$ denotes a Hermitian matrix of a matrix X and $X^{-1}$ denotes an inverse matrix of the matrix X. Each column of the matrix F of Equation 14 corresponds to a beamforming vector for each UE. That is, $w_i=f_i$. In this case, an effective channel for each UE can be represented by Equation 15.

$$h_i w_k = \begin{cases} \frac{1}{\|w_i\|} & i = k \\ 0 & i \neq k \end{cases}$$ [Equation 15]

When ZF is used, a channel of each UE takes the form of an identity matrix, and thus each UE can receive a signal from which interference has been cancelled in advance.

Coordinated Multi-Point (CoMP) System

In order to meet the requirements of LTE-A, coordinated multi-point (CoMP) transmission (usually referred to as co-MIMO, collaborative MIMO, network MIMO, etc.) has been proposed for system performance enhancement. CoMP can increase cell-edge UE performance and enhance average sector throughput.

In general, inter-cell interference (ICI) may reduce cell-edge UE performance and average sector throughput under a multi-cell environment with a frequency reuse factor of 1. To mitigate ICI, a simple passive technique, such as fractional frequency reuse (FFR) with UE specific power control has been employed in LTE in order to provide reasonable throughput performance for cell-edge UEs in an interference-limited environment. Instead of reducing frequency resource usage per cell, it is more beneficial to reuse ICI as a desired signal or to mitigate the ICI. To accomplish the above object, CoMP transmission is applicable.

CoMP schemes applicable to downlink may be categorized into joint processing (JP) and coordinated scheduling/beamforming (CS/CB).

In JP, each point (eNB) of a CoMP coordination unit may use data. The CoMP coordination unit refers to a set of eNBs used for a coordinated transmission scheme. JP may be divided into joint transmission and dynamic cell selection.

Joint transmission refers to a scheme through which PDSCHs are simultaneously transmitted from a plurality of points (some or all CoMP coordination units). That is, data may be simultaneously transmitted to a single UE from a plurality of transmission points. Through joint transmission, quality of a received signal may be improved coherently or non-coherently and interference on other UEs may be actively eliminated.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE may be dynamically selected.

According to the CS/CB scheme, CoMP coordination units may collaboratively perform beamforming of data transmission to a single UE. Here, user scheduling/beamforming may be determined according to coordination of cells in a corresponding CoMP coordination unit although data is transmitted only from a serving cell.

In uplink, coordinated multi-point (CoMP) reception refers to reception of a signal transmitted according to coordination among a plurality of points geographically spaced apart from one another. A CoMP reception scheme applicable to uplink may be classified into joint reception (JR) and coordinated scheduling/beamforming (CS/CB).

JR is a scheme in which all or some points of a CoMP unit receive a signal transmitted over a PDSCH. CS/CB is a scheme in which user scheduling/beamforming is determined according to coordination among cells in a corresponding CoMP unit while one point receives signals over a PDSCH.

Coordinated Precoding Method

A representative spatial domain BS coordinated scheme may include joint transmission (JT), coordinated beamforming (CB), and interference alignment (IA). The JT, CB, and IA schemes have disadvantages in that CSI (e.g., PMI, RI, etc.) should be fed back to all BSs causing interference, so that the number of CSI feedback times is also increased in response to the increasing interference link. The present invention requests PMI restriction from any one of a plurality of base stations (BSs) causing interference in a multi-cell interference channel (IFC) (i.e., the present invention requests beam restriction of an interference cell so as to receive less interference from the interference cell), and the remaining interference can be cancelled through time/frequency orthogonalization. For convenience of description and better understanding of the present invention, an exemplary case of using three base stations (BSs) (or three cells) related to the above-mentioned BS coordination and a method for extending the scope of the present invention to three or more BSs will hereinafter be described in detail. In addition, an exemplary case in which the present invention is applied to a Single-Input and Single-Output (SISO) system will first be described, and another case in which the scope of the present invention is extended to MIMO will then be described.

The present invention is designed to basically consider the interference channel. N-user interference channel (IFC) may indicate, when N transmitter-receiver (Tx/Rx) pairs and the transmitter transmit information only to a target receiver, interference generated from the other transmitters serving as non-target transmitters. In this case, maximum capacity of the system has not been defined yet. Accordingly, many developers and companies are conducting intensive research into a method for estimating capacity using the degree of freedom (DoF) indicating a metric value calculated by approximation at a high SNR (Signal to Noise Ratio). In this case, DoF may be represented by the following equation 16.

$$d = \lim_{SNR \to \infty} \frac{C(SNR)}{\log(SNR)}$$ [Equation 16]

In Equation 16, C is a total sum of network capacities, and SNR is an abbreviation of the Signal to Noise Ratio. It is well known to those skilled in the art that a maximum DoF of the N-user SISO interference channel is set to N/2. In this case, the degree of freedom (DoF) may be interpreted as a slot obtained when SNR is infinite. In other words, the DoF may be interpreted as the number of links capable of being transmitted/received without interference. However, in order to obtain a maximum DoF, all receivers must feed back channel information received from all transmitters to all transmitters, resulting in a heavy burden in channel estimation and feedback.

In this case, the above-mentioned interference channel (ICF) may be a fully connected ICF. In other words, the interference channel (ICF) may be a channel through which all transmitters cause interference to all receivers. Here, if the signal intensity of some interference channels (IFCs) is very weak, these IFCs may be modeled as a partially connected IFC. For example, if one of two interference channels (IFCs) other than a desired link in the 3-user IFC is very weak, this channel may be represented by a non-connected channel.

Figure 8:
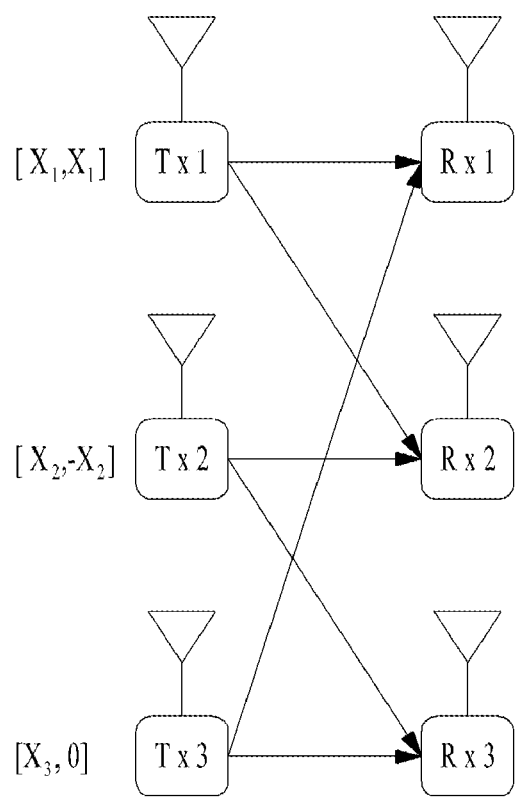
FIG. 8 exemplarily shows a symmetric partially connected 3-user SISO interference channel (IFC) according to an embodiment of the present invention.

FIG. 8 exemplarily shows a symmetric partially connected 3-user SISO interference channel (IFC) according to an embodiment of the present invention.

Referring to FIG. 8, interference can be cancelled by the time or frequency block encoding method without channel information feedback in the symmetric partially connected IFC. In this case, the expression "symmetric" may indicate that the same partially-connected characteristics are applied to all users in terms of the number of connections from the viewpoint of reception or transmission.

$X_1 = [x_1, x_1]$ $X_2 = [x_2, -x_2]$ $X_3 = [x_3, 0]$ [Equation 17]

In Equation 17, it is assumed that $x_i \in C^{[x]}$ is a transmit (Tx) symbol of the transmitter (TX), and channel is unchanged during two time/frequency resources in the same manner as in Space-Time Block Coding (STBC)/Space-Frequency Block Coding (SFBC). The proposed encoding method may also be referred to as a quasi-orthogonal CDM code.

The decoding process of the Q-CDM code proposed by Equation 17 will hereinafter be described in order of receivers.

First, Receiver 1 (RX 1) may receive a signal from transmitters (TX 1, TX3). In this case, a second symbol is received without interference, so that RX 1 allows only the second symbol to be used for decoding. RX 2 may receive signals from the transmitters (TX 1, TX 2). In this case, assuming that a first receive (Rx) signal and a second receive (Rx) signal are subtracted, interference from the TX 1 can be removed.

Receiver 3 (RX 3) may receive signals from the transmitters (TX 2, TX 3). If the first Rx signal is added to the second Tx signal, interference from the transmitter (TX 2) can be removed.

The above-mentioned content can be represented by the following equations 14 to 16. Equation 18 may indicate RX 1, Equation 19 may indicate RX 2, and Equation 20 may indicate RX 3.

$y_1(1) = h_{11}x_1 + h_{13}x_3 + n_1(1)$ $y_1(2) = h_{11}x_1 + n_1(2) \Rightarrow y_1(2) = h_{11}x_1 + n_1(2)$ [Equation 18]

$y_2(1) h_{21}x_1 + h_{22}x_2 + n_2(1)$ $y_2(2) = h_{21}x_1 - h_{22}x_2 + n_2(2) \Rightarrow y_2(1) - y_2(2) = 2h_{22}x_2 + n_2(1) - n_2(2)$ [Equation 19]

$y_3(1) = h_{32}x_2 + h_{33}x_3 + n_3(1)$ $y_3(2) = -h_{32}x_2 + n_3(2) \Rightarrow y_3(1) + y_3(2) = h_{33}x_3 + n_3(1) + n_3(2)$ [Equation 20]

In Equations 18 to 20, $h_{ij}$ is a channel between TX j and RX i, $x_i$ is a transmit (Tx) symbol of TX i, and $n_i(n) \triangleq$ is a noise signal of RX i in the n-th time or the frequency domain.

According to the above-mentioned method, a maximum DoF (3/2) of the 3-user IFC can be achieved by applying the partially connected IFC to the Q-CDM code without channel information feedback. In more detail, each node pair is designed to transmit/receive one symbol without interference during two time regions (or twe frequency regions), the DoF for each node is denoted by 1/2 and 3 users are present, so that a total DoF is denoted by 3/2. The above-mentioned method has an advantage in that it can achieve a maximum DoF without channel information feedback in the 3-user IFC.

However, since the actual IFC is not partially connected, users may be scheduled to have characteristics similar to those of the partially connected IFC so that the Q-CDM code proposed by the present invention can be used. For example, the receiver may measure the intensity of two IFCs. If one of the two IFCs is equal to or less than a specific threshold value (i.e., a threshold value may be determined in advance, and may be indicated by the transmitter), the corresponding interference channel may be considered an unconnected IFC. Although the actual radio frequency (RF) channel may be modeled as a symmetric partially connected IFC, it should be noted that the RF channel may also be modeled as an asymmetric partially connected IFC during the user scheduling process.

In order to use the Q-CDM code proposed by Equation 17, the partially connected IFCs must be symmetrical to each other. For example, as can be seen from FIG. 8, the transmitter (TX 3) gives interference to the receiver (RX 2) instead of the other receiver (RX 1), the Q-CDM code cannot be applied to the present invention. In more detail, the interference direction may be denoted by TX 1→RX 2, TX 2→RX 3, TX 3→RX 1, or may also be denoted by TX 1→RX 3, TX 2→RX 1, TX 3→RX 2. Accordingly, the symmetric partially connected IFC in case of 3 users has only two IFCs, and a detailed description thereof will be described later with reference to FIG. 12.

The proposed Q-CDM code is not unique, and may be modified in various ways. The Q-CDM code may be classified into Class A and Class B according to the Q-CDM code generation method. Details of the respective code classes are as follows. Since there are 3 users and the corresponding code is transmitted during two time regions or two frequency regions, this concept may be represented by 2×3. In this case, the n-th column is used by the n-th transmitter (TX). If the transmit (Tx) symbol is multiplied by the code matrix, the multiplied result is a code to be actually used.

1) In case of the 3-user Q-CDM code class A, a (2×2) orthogonal matrix is formed, and a (2×1) vector for spanning a vector space different from that of the orthogonal matrix is added thereto, resulting in formation of a (2×3) matrix. In this case, permutation may be applied to the order of columns. If permutation is applied, a code used by each user may be changed. For example, the code shown in the following equation 21 may be present.

$$\begin{bmatrix} 1 & 1 & 1 \\ 1 & -1 & 0 \end{bmatrix},$$
$$\begin{bmatrix} 1 & 0 & 1 \\ 0 & 1 & 1 \end{bmatrix},$$
$$\begin{bmatrix} 1 & -j & 1 \\ j & 1 & 0 \end{bmatrix} \dots$$ [Equation 21]

As described above, a usage example of the class A code may be used in the 3-user symmetric partially IFC or in a symmetrically modeled 3-user IFC.

Referring to the 3-user Q-CDM code class B, a (2×2) orthogonal matrix is formed, and one of the columns of the orthogonal matrix is added, resulting in formation of a (2×3) matrix. In this case, permutation may be applied to the order of columns. If the permutation is applied to the order of columns, a code used by each user is changed. For example, the code shown in the following equation 22 may be present.

$$\begin{bmatrix} 1 & 1 & 1 \\ 1 & -1 & 1 \end{bmatrix},$$
$$\begin{bmatrix} 1 & 0 & 1 \\ 0 & 1 & 0 \end{bmatrix},$$
$$\begin{bmatrix} 1 & 0 & 0 \\ 0 & 1 & 1 \end{bmatrix},$$
$$\begin{bmatrix} 1 & -j & 1 \\ j & 1 & j \end{bmatrix} \dots$$ [Equation 22]

The class B code can be used in one case in which connected characteristics of the 3-user IFC are asymmetrical, or in the other case in which connected channels can be asymmetrically modeled.

In order to use the Q-CDM code in the cellular system, appropriate user scheduling and code selection are needed. For convenience of description and better understanding of the present invention, it is assumed that the base station (BS) has a set of available Q-CDM codes, and this code set has already been known to the UE.

For example, if the BS has the code sets (two code sets in Class A, three code sets in Class B) shown in the following equation 23, the UE need to select one of the code sets.

$$\begin{bmatrix} 1 & 1 & 1 \\ 1 & -1 & 0 \end{bmatrix},$$
$$\begin{bmatrix} 1 & 1 & 1 \\ 1 & 0 & -1 \end{bmatrix},$$
$$\begin{bmatrix} 1 & 1 & 1 \\ 1 & -1 & 1 \end{bmatrix},$$ [Equation 23]

$$\begin{bmatrix} 1 & 1 & 1 \\ 1 & 1 & -1 \end{bmatrix},$$
$$\begin{bmatrix} 1 & 1 & 1 \\ -1 & 1 & 1 \end{bmatrix}$$

The user scheduling process and the code selection process will hereinafter be described in detail. In this case, the present invention considers two methods. A first method first selects the code, and then selects the user. A second method may receive feedback information of a CQI that does not assume a specific code, and may share the CQI feedback information between the base stations through a backhaul (e.g., X2 interface), and then select a desired code.

In accordance with the first method, the codeword pattern is first semi-statically decided using a long term CQI (e.g., RSRP (Reference Signal Received Power), RSSI (Received Signal Strength Indicator), etc.) that has been fed back from the UE, and the user appropriate for the corresponding code is selected. Therefore, each user feeds back only a CQI corresponding to the code, so that each user need not estimate an unconnected IFC and need not report a CQI.

In accordance with the second method, a more optimum code is selected using a CQI obtained when a specific code from the user is not assumed, and a user can be scheduled, however, the feedback amount of channel information and the amount of CQI transmitted over a backhaul can be increased. In the case of using the second method, the code pattern can be more dynamically decided than the above-mentioned first method. The first method for coordinated precoding (See FIG. 9) and the second method (See FIG. 10) will hereinafter be described with reference to FIGS. 9 and 10.

Figure 9:
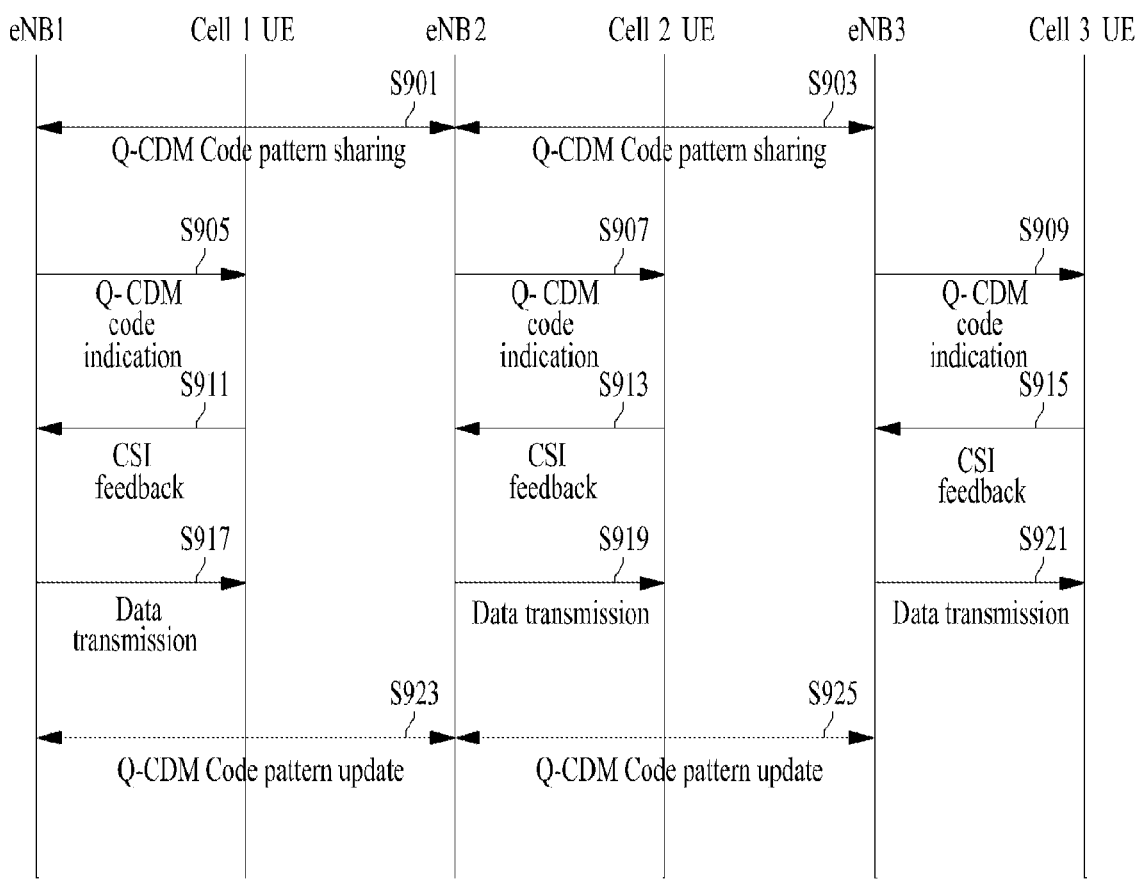
FIGS. 9 and 10 are flowcharts illustrating a coordinated precoding method according to an embodiment of the present invention.

FIG. 9 is a flowchart illustrating a coordinated precoding method according to an embodiment of the present invention. In FIG. 9, Cell 1 UE, Cell 2 UE, and Cell 3 UE may indicate a UE belonging to Cell 1, a UE belonging to Cell 2, and a UE belonging to Cell 3, respectively. The Cell 1 UE to Cell 3 UE may be implemented by one UE or may also be implemented by a plurality of UEs.

Referring to FIG. 9, the BS may decide the Q-CDM code using a long term CQI fed back from the UE in advance in step S901, and information regarding a predetermined Q-CDM code pattern is shared between the contiguous BSs in step S903. In this case, the Q-CDM code pattern sharing operation may indicate that a long term CQI (e.g., RSSI, RSRP, etc.) is shared between the BSs through a backhaul link. In more detail, the Q-CDM code pattern sharing operation may indicate the operation for sharing the Q-CDM code. In addition, the Q-CDM code may be decided through negotiation between the contiguous BSs. For example, assuming that BS 1 (or eNB1) informs the contiguous BS (eNB2) that the code pattern 1 will be selected, if the corresponding code pattern generates high interference in BS 2 (eNB2), the BS 2 (eNB2) may recommend other code patterns. In this case, if it is determined that high throughput attenuation does not occur in the code recommended by BS 2 (eNB2), the BS 1 (eNB1) may use the corresponding code. Alternatively, the BS may decide the ranking of preferred code sets, so that the decided ranking information may be shared between the contiguous BSs. Each BS (eNB) may transmit a predetermined Q-CDM code pattern to one or more UEs located in the cell coverage of the corresponding BS in steps S905, S907, and S909. UE(s) may feed back CQI of the corresponding Q-CDM code to their BSs in steps S911, S913, and S915. Each BS (or eNB) may transmit data to UE(s) in steps S917, S919, and S921, and may re-share information regarding the updated Q-CDM code pattern between the contiguous eNBs in steps S923 and S925.

Figure 10:
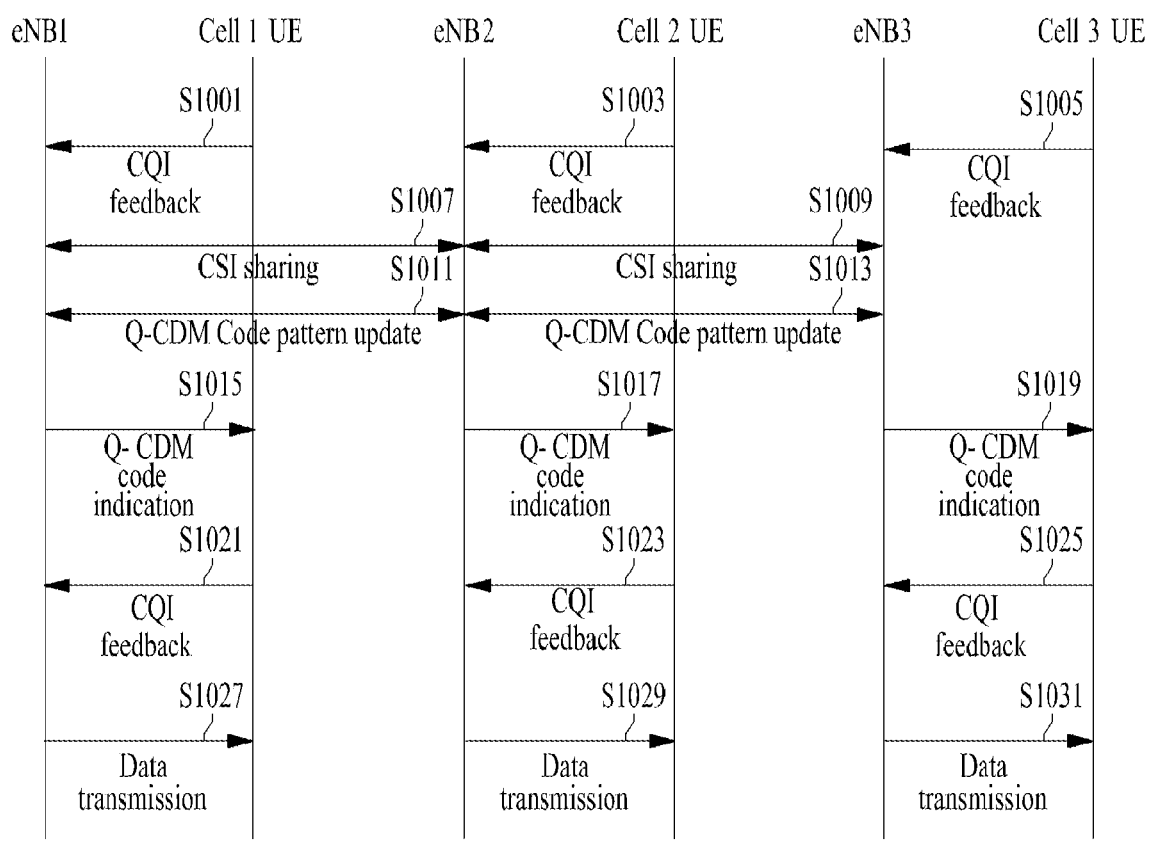

FIG. 10 is a flowchart illustrating a coordinated precoding method according to an embodiment of the present invention. In FIG. 10, Cell 1 UE, Cell 2 UE, and Cell 3 UE may indicate a UE belonging to Cell 1, a UE belonging to Cell 2, and a UE belonging to Cell 3, respectively. Alternatively, Cell 1 UE to Cell 3 UE may be implemented by one UE or may also be implemented by a plurality of UEs.

Referring to FIG. 10, UE(s) of respective cells may feed back CQI to the eNBs in steps S1001, 1003, and S1005. In this case, UE(s) of the respective cells assume(s) that the Q-CDM code is not configured, and may measure CQI from all BSs (eNBs) and report the CQI. The respective eNBs may share the CQI fed back from the respective UEs with the contiguous eNB through a backhaul link in steps S1007 and S1009. In this case, the shared CQI may be used for all UEs, for a UE group, or for a specific UE.

Each BS may decide the Q-CDM code pattern for maximizing the sum of transfer rates on the basis of the shared CQI, and may share information regarding the decided Q-CDM code pattern with other eNBs in steps S1011 and S1013. However, if a common Q-CDM code is decided through CQI sharing, the steps S1011 and S1013 may be omitted as necessary.

The BS may transmit a predetermined Q-CDM code pattern to one or more UEs located in the cell coverage of the corresponding BS in steps S1015, S1017, and S1019.

The UE may report a CQI of the corresponding Q-CDM code to its own BS in steps S1021, S1023, and S1025. In this case, the UE may report only a CQI received from its own BS. The respective BSs may transmit data to UE(s) in steps S1027, S1029, and S1031.

The first method and the second method may be activated using other Q-CDM codes on a subband basis, and may also be activated by applying the same Q-CDM code to all resource blocks (RBs). In the former case, an optimum Q-CDM code for each subband can be used. In the latter case, the amount of information shared through channel information feedback or through a backhaul link can be reduced.

A method for applying the above-mentioned Q-CDM code to multiple antennas (MIMO) will hereinafter be described in detail.

If the transmitter uses multiple antennas (MIMO), the partially connected characteristics through null precoding can be more effectively formed. The null processing may indicate the precoding method in which Rx power is set to zero when the code is multiplied by an interference channel. The null processing is only exemplary, and the scope or spirit of the present invention is not limited thereto. For convenience of description and better understanding of the present invention, the following description will hereinafter be described on the assumption of the null precoding.

For the legacy coordinated precoding for use in the 3-user interference channel, each UE may estimate a MIMO channel from three transmitters, may select a PMI having the shortest distance at the MIMO channel, and may feed back the selected PMI. In this case, if a total amount of feedback information received from the receiver is limited, feedback overhead per channel is reduced, resulting in reduction of PMI accuracy. The present invention feeds back a PMI to a single transmitter through association between the Q-CDM code and the precoding method, so that PMI quantization resolution per channel is not reduced, and as such a detailed description thereof will hereinafter be described with reference to FIG. 11.

Figure 11:
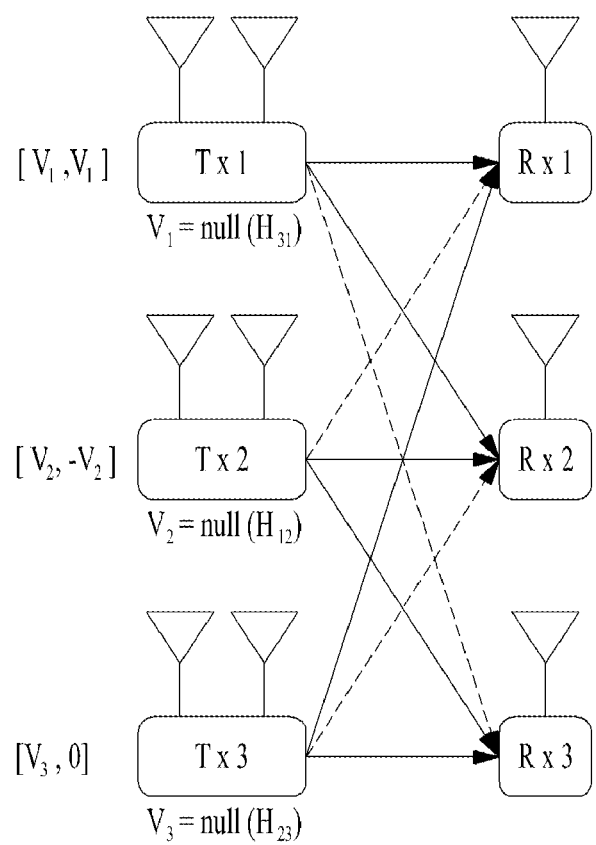
FIG. 11 is a flowchart illustrating a coordinated precoding method for use in a 3-user MISO interference channel according to an embodiment of the present invention.

FIG. 11 is a conceptual diagram illustrating a coordinated precoding method for use in the 3-user MISO interference channel (IFC) according to an embodiment of the present invention.

FIG. 11 exemplarily shows the coordinated precoding method for use in the case in which the Q-CDM code shown in FIG. 8 is used in (2×1) MISO (multiple input single output).

Referring to FIG. 11, in order to apply the encoding method for use in the partially connected IFC to the fully connected IFC, each transmitter (TX) is designed in a manner that a beamforming vector $V_i$ of TX i is used as a null of the (i−1)-th receiver (RX), as represented by the following equation 24.

$$V_1 = \text{null}(H_{31})$$

$$V_2 = \text{null}(H_{12})$$

$$V_3 = \text{null}(H_{23}) \quad \text{[Equation 24]}$$

In this case, each transmitter (TX) may report a PMI having the shortest chordal distance to a null precoder or a MIMO channel. Equation 24 is only exemplary, but is not limited to a specific precoding method. Although the example of FIG. 11 has exemplarily disclosed the 2×1 MIMO interference channel, the scope or spirit of the present invention can also be extended to a M×N MIMO interference channel. In this case, M is the number of transmit (Tx) antennas, and N is the number of receive (Rx) antennas. In this case, assuming that a rank transmitted at TX i is denoted by $d_i$, the following conditions shown in FIGS. 25 and 26 must be satisfied.

$$d_i \leq \min(M, N) \quad \text{[Equation 25]}$$

$$d_i \leq M - N \quad \text{[Equation 26]}$$

Equation 25 may indicate that the number of transmit (Tx) streams is not higher than the number of Tx/Rx antennas. Equation 26 is an indispensable condition needed for satisfying Equation 24. For example, in case of $V_1$, when a data symbol (d 1) applied to RX 1 is sent, the data symbol d1 must be present in a zero space of $H_{31}$, and a zero-space dimension of H is achieved because of the presence of M−N. For example, in case of M=4 and N=2, $d_i \leq 2$ is given. This means that the rank is limited to a maximum of M−N when the Q-CDM code is used. When PMI is fed back to the UE according to whether the Q-CDM code is used, an unnecessary operation and feedback can be prevented from occurring.

In FIG. 11, an interference signal denoted by a dotted line is removed by null beamforming, and an interference signal denoted by a solid line may be removed by the Q-CDM code of Equation 24. Information as to which interference signal will be removed by null beamforming must be decided so that an issue occurs. In this case, a signal having higher signal intensity from among interference signals may be removed by the Q-CDM code. Since residual interference caused by channel quantization occurs, the null beamforming can reduce the residual interference using the Q-CDM code capable of being more perfectly removed as the interference intensity gradually increases. However, the feedback direction in a specific Tx/Rx antenna configuration must be symmetrical. If each receiver (RX) performs PMI restriction using the same one transmitter (TX), it may be impossible to make the nulling precoder due to insufficiency of spatial dimension. For example, assuming that the BS has four antennas and the UE has two antennas, if two receivers (RXs) request the nulling precoding from one transmitter (TX), the corresponding TX may not transmit the data stream (the size of zero space from two receivers (RXs) is identical to M−2N=4−4=0). However, if many transmit (Tx) antennas are used, the above-mentioned case does not occur irrespective of the nulling precoding requested by RX. Therefore, the following two cases may be used according to the number of Tx/Rx antennas.

1) M>2N

In this case, since many Tx antennas are used, RX may request the nulling precoding from any of TXs without any problems. Therefore, both the 3-user Q-CDM code class A and the 3-user Q-CDM code class B can be used. In accordance with the present invention, although the number of PMIs fed back by the UE is limited to one PMI, if the modeling is achieved by the asymmetric partially connected IFC, the UE need not feed back only one PMI. If necessary, the number of PMIs fed back by the UE may be set to 2, or no PMI may also be fed back as necessary.

The process for deciding the Q-CDM code is as follows.

First, each UE may measure RSRP from an interference channel, and may determine whether RSRP of the interference channel is higher than a predetermined value or a threshold value indicated by the BS. Subsequently, the UE may command the BS to remove an interference channel exceeding the threshold value using the Q-CDM code. UE may directly feed back RSRP from each BS, and may also feed back a preferred Q-CDM code (or code set).

The BS may share RSRP information or Q-CDM code (or code set), that has been fed back from the UE, among the contiguous BSs, and may decide an optimum Q-CDM code. In addition, the BS may inform the UE of the decided Q-CDM code, and the UE may feed back PMI and CQI to the BS on the basis of the Q-CDM code. The BS may share a feedback PMI among the BSs through a backhaul link, decide a precoder, and transmit data.

2) M≤2N

In case of M≤2N, TX, that is considered strong interference by each RX, may overlap with another TX. If TX overlaps with another TX among receivers (RXs), it is impossible to use the Q-CDM code scheme to which the nulling precoding is applied. In this case, it is impossible for the corresponding TX on antenna dimension to simultaneously perform nulling for two RXs, such that the connectivity structure/connectivity pattern (i.e., feedback direction) must be configured in a symmetrical form so as to avoid the above decision. Accordingly, it is possible to use the Q-CDM code class A only. In this case, the available symmetric connectivity structure is shown in FIG. 12.

Figure 12:
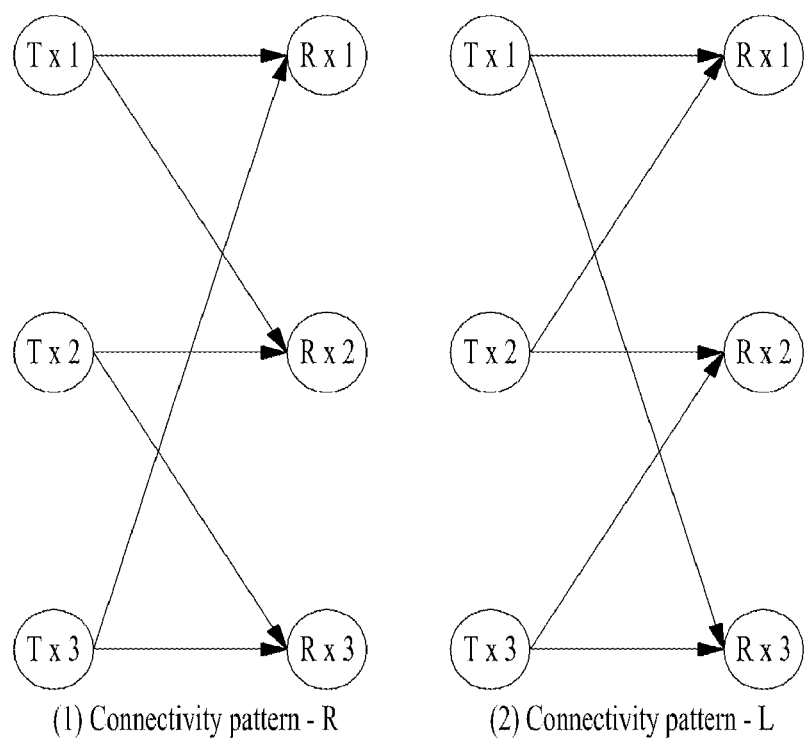
FIG. 12 exemplarily shows an available connection structure between a transmitter and a receiver for use in the 3-user partially connected interference channel (IFC) according to an embodiment of the present invention.

FIG. 12 is a conceptual diagram illustrating an available connection structure between the transmitter and the receiver in the 3-user partially connected IFC according to an embodiment of the present invention.

In the connectivity pattern-R of FIG. 12(*a*), RX 1 feeds back a PMI to TX 2, RX 2 feeds back a PMI to TX 3, and RX 3 feeds back a PMI to TX 1. In the connectivity pattern –L of FIG. 12(*b*), RX 1 feeds back a PMI to TX 3, RX 2 feeds back a PMI to TX 1, and RX 3 feeds back a PMI to TX 2. In order to decide such connectivity pattern, each RX may measure RSRP from the contiguous BS, share the measured RSRP between the BSs through a backhaul link, and decide an optimum connectivity structure. After RXs decide their preference connectivity patterns, the decided preference connectivity patterns are shared between TXs, so that the presence of many preference patterns may be decided. For example, if RX 1 decides Pattern 1, if RX 2 decides Pattern 2, and if RX 3 decides Pattern 1, Pattern 1 can be finally selected.

The process for deciding the Q-CDM code is as follows.

First, each UE may measure RSRP from an interference channel, and may determine whether RSRP of the interference channel is higher than a predetermined value or a threshold value indicated by the BS. Subsequently, the UE may command the BS to remove an interference channel exceeding the threshold value using the Q-CDM code. UE may directly feed back RSRP from each BS, and may also feed back a preferred Q-CDM code (or code set). In this case, the Q-CDM code set may be selected from Class A only.

The BS may share RSRP information or Q-CDM code (or code set), that has been fed back from the UE, among the contiguous BSs, and may decide an optimum Q-CDM code. In addition, the BS may inform the UE of the decided Q-CDM code, and the UE may feed back PMI and CQI to the BS on the basis of the Q-CDM code. The BS may share a feedback PMI among the BSs through a backhaul link, decide a precoder, and transmit data.

Although the 3-user MIMO interference channel has been disclosed, the scope or spirit of the present invention can also be equally extended to the 4-user MIMO interference channel. In the case of using the Q-CDM code in the 4-user MIMO interference channel, the (2×2) orthogonal code is first made, and the (2×2) orthogonal code is repeated to make a (2×4) matrix. For example, the code shown in the following equation 27 may be present.

$$\begin{bmatrix} 1 & 1 & 1 & 1 \\ 1 & -1 & 1 & -1 \end{bmatrix},$$

$$\begin{bmatrix} 1 & 0 & 1 & 0 \\ 0 & 1 & 0 & 1 \end{bmatrix}, \dots \quad \text{[Equation 27]}$$

In this case, the i-th column is a code that is used by TX i in two time regions or two frequencies regions. In this case, permutation may be applied to the order of columns. This means that a code used by each user to which permutation is applied is changed.

Figure 13:
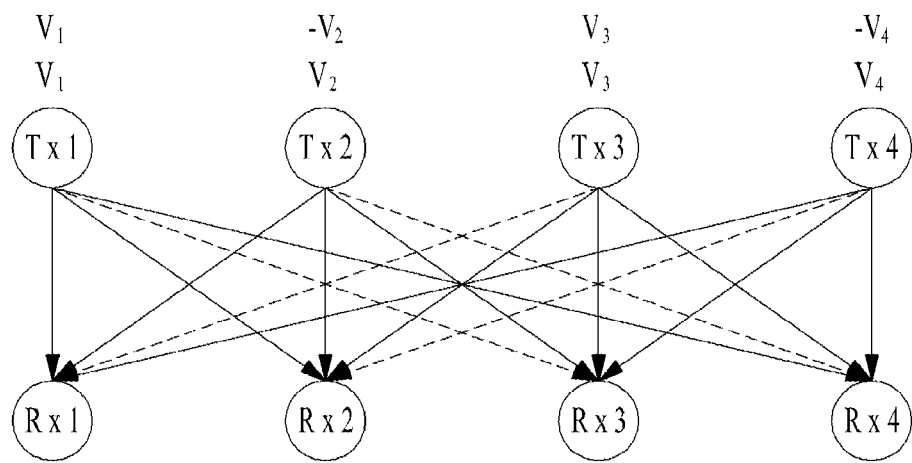
FIG. 13 is a conceptual diagram illustrating a coordinated precoding method for use in a 4-user interference channel (IFC) according to an embodiment of the present invention.

FIG. 13 is a conceptual diagram illustrating a coordinated precoding method for use in the 4-user interference channel (IFC) according to an embodiment of the present invention.

From the viewpoint of RX 1 in the example of FIG. 13, interference from TX 2 and interference from TX 4 can be removed by CDM, and RX 1 may feed back a PMI to TX 3. If four cells transmit/receive interference, the Q-CDM structure is denoted by the following equation 28.

$$X_1(1)=V_1 S_1, X_1(2)=V_1 S_1$$

$$X_2(1)=V_2 S_2, X_2(2)=-V_2 S_2$$

$$X_3(1)=V_3 S_3, X_3(2)=V_3 S_3$$

$$X_4(1)=V_4 S_4, X_4(2)=-V_4 S_4 \quad \text{[Equation 28]}$$

Equation 28 is only exemplary, and the Q-CDM structure is not limited thereto. The precoder $V_i$ of each TX may be decided in a manner that TX-RX pairs generating the same Q-CDM format can be mutually nullified. The example of FIG. 13 shows that a pair of 1 and 3, and a pair of 2 and 4 are mutually interfered, so that these pairs may be designed as shown in the following equation 29.

$$V_1=\text{null}(H_{31})$$

$$V_3=\text{null}(H_{13})$$

$$V_2=\text{null}(H_{42})$$

$$V_4=\text{null}(H_{24}) \quad \text{[Equation 29]}$$

General Apparatus Applicable to the Present Invention

Figure 14:
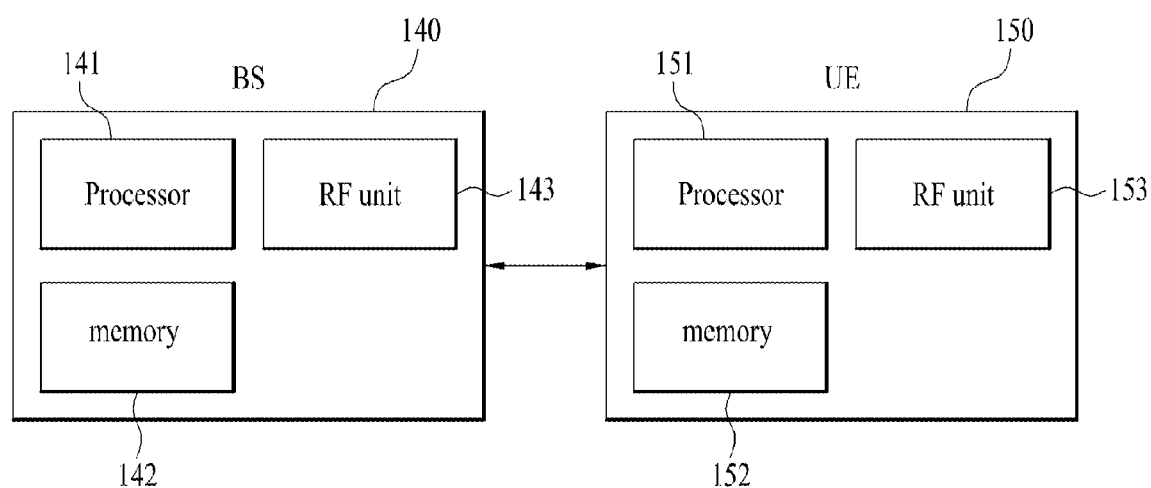
FIG. 14 is a block diagram illustrating a wireless communication apparatus applicable to embodiments of the present invention.

FIG. 14 is a block diagram illustrating a wireless communication apparatus according to an embodiment of the present invention.

Referring to FIG. 14, the wireless communication system includes a base station (BS) 140 and a plurality of UEs 150 located in the BS region 140.

The BS 140 includes a processor 141, a memory 142, and a radio frequency (RF) unit 143. The processor 141 may be constructed to implement the procedures and/or methods disclosed in the embodiments of the present invention. Layers of the radio interface protocol may be implemented by the processor 141. The memory 142 may be connected to the processor 141, and store various information related to operations of the processor 141. The RF unit 143 is connected to the processor 141, and transmits and/or receives RF signals.

The UE 150 includes a processor 151, a memory 152, and an RF unit 153. The processor 151 may be constructed to implement the procedures and/or methods disclosed in the embodiments of the present invention. Layers of the radio interface protocol may be implemented by the processor 151. The memory 152 may be connected to the processor 151, and store various information related to operations of the processor 151. The RF unit 153 is connected to the processor 151, and transmits and/or receives RF signals.

The memory 142 or 152 may be located inside or outside the processor 141 or 151, and may be connected to the processor 141 or 151 through various well known means. In addition, the BS 140 and/or the UE 150 may have a single antenna or multiple antennas.

The embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

[Industrial Applicability]

As is apparent from the above description, although various embodiments of the present invention have been disclosed on the basis of application to 3GPP LTE, the inventive concept of the present invention is applicable not only to 3GPP LTE, but also to other mobile communication systems.

The invention claimed is:

1. A method for supporting coordinated precoding in a wireless access system, comprising:
    transmitting, by a user equipment (UE), a measurement result of a plurality of interference signals transmitted from a plurality of contiguous base stations (BSs) to a base station (BS);
    receiving, by the user equipment (UE), quasi-orthogonal CDM (Q-CDM) code information decided by the base station (BS) and the plurality of contiguous base stations (BSs) from the base station (BS) so as to remove some of the plurality of interference signals;
    transmitting, by the user equipment (UE), channel state information (CSI) to the base station (BS) on the basis of the Q-CDM code; and
    receiving, by the user equipment (UE), downlink data to which the coordinated precoding is applied, from the base station (BS),
    wherein an interference signal having a higher intensity than a predetermined threshold value from among the plurality of interference signals is removed through the Q-CDM code, and an interference signal having a lower intensity than a predetermined threshold value from among the plurality of interference signals is removed through null precoding.

2. The method according to claim 1, wherein the measurement result includes signal intensity information of the plurality of interference signals.

3. The method according to claim 1, wherein the measurement result includes one or more Q-CDM code information for removing an interference signal having a higher signal intensity than a predetermined threshold value from among the plurality of interference signals.

4. The method according to claim 1, wherein the measurement result is any one of channel quality information (CQI) of the plurality of interference signals, a reference signal received power (RSRP), and a received signal strength indicator (RSSI).

5. The method according to claim 1, wherein the channel quality information (CQI) includes at least one of a precoding matrix indicator (PMI) and channel quality information (CQI).

6. A user equipment (UE) device for supporting coordinated precoding in a wireless access system comprising:
    a radio frequency (RF) unit configured to transmit/receive a radio frequency (RF) signal; and
    a processor,
    wherein the processor transmits a measurement result of a plurality of interference signals transmitted from a plurality of contiguous base stations (BSs) to a base station (BS), receives quasi-orthogonal CDM (Q-CDM) code information decided by the base station (BS) and the plurality of contiguous base stations (BSs) from the base station (BS) so as to remove some of the plurality of interference signals, transmits channel state information (CSI) to the base station (BS) on the basis of the Q-CDM code, and receives downlink data to which the coordinated precoding is applied, from the base station (BS), wherein an interference signal having a higher intensity than a predetermined threshold value from among the plurality of interference signals is removed through the Q-CDM code, and an interference signal having a lower intensity than a predetermined threshold value from among the plurality of interference signals is removed through null precoding.

7. The user equipment (UE) device according to claim 6, wherein the measurement result includes signal intensity information of the plurality of interference signals.

8. The user equipment (UE) device according to claim 6, wherein the measurement result includes one or more Q-CDM code information for removing an interference signal having a higher signal intensity than a predetermined threshold value from among the plurality of interference signals.

9. The user equipment (UE) device according to claim 6, wherein the measurement result is any one of channel quality information (CQI) of the plurality of interference signals, a reference signal received power (RSRP), and a received signal strength indicator (RSSI).

10. The user equipment (UE) device according to claim 6, wherein the channel quality information (CQI) includes at least one of a precoding matrix indicator (PMI) and channel quality information (CQI).

* * * * *